United States Patent
Graham et al.

(10) Patent No.: US 12,409,571 B1
(45) Date of Patent: Sep. 9, 2025

(54) SNAKE-ARM ROBOT AND JOINT THEREFOR

(71) Applicants: General Electric Company, Schenectady, NY (US); Oliver Crispin Robotics Limited, Altrincham (GB)

(72) Inventors: Andrew Crispin Graham, Badminton (GB); Tim Henri Ann Francois, Emersons Green (GB); Joseph Nelson, Cheswick Village (GB); Rory Bateman, St. George (GB)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 0 days.

(21) Appl. No.: 18/599,944

(22) Filed: Mar. 8, 2024

(51) Int. Cl.
*B25J 18/06* (2006.01)
*B25J 9/06* (2006.01)
*B25J 9/10* (2006.01)

(52) U.S. Cl.
CPC ............... *B25J 18/06* (2013.01); *B25J 9/065* (2013.01); *B25J 9/104* (2013.01)

(58) Field of Classification Search
CPC .......... B25J 9/065; B25J 9/1045; B25J 18/06
See application file for complete search history.

(56) References Cited

U.S. PATENT DOCUMENTS

| | | |
|---|---|---|
| 4,751,821 A | 6/1988 | Birchard |
| 4,815,911 A | 3/1989 | Bengtsson |
| 4,977,790 A | 12/1990 | Nishi |
| 7,033,979 B2 | 4/2006 | Herwig |
| 7,543,518 B2 | 6/2009 | Buckingham |

(Continued)

FOREIGN PATENT DOCUMENTS

| | | | | |
|---|---|---|---|---|
| CN | 112356016 B | * | 2/2022 | ............ B25J 17/00 |
| CN | 112405508 B | * | 2/2022 | ............ B25J 9/065 |

(Continued)

OTHER PUBLICATIONS

Non-Patent Literature Document Disclosing YouTube Video entitled "Virtual Sphere Rolling Joint Robot Arm (Dynamixel + OpenRB-150)"; https://www.youtube.com/watch?v=tcDDDaSMW0I, published Aug. 29, 2022; Screenshots—9 pgs.

(Continued)

*Primary Examiner* — Bobby Rushing, Jr.
(74) *Attorney, Agent, or Firm* — Fitch, Even, Tabin & Flannery LLP

(57) ABSTRACT

A snake-arm robot assembly may include a first link and a second link with a joint formed therebetween including first and second contact portions in rolling contact with one another to allow the first and second links to pivot with respect to one another. The first and second contact portions are configured to contact one another at first and second contact points corresponding to a first orientation and third and fourth contact points corresponding to a second orientation. The joint may be configured such that a line of action of a net force acting on the joint is incident with a first reference line extending between the first and second contact points with the links in the first orientation, and the line of action is incident with a second reference line extending between the third and fourth contact points when the links are in the second orientation.

18 Claims, 14 Drawing Sheets

(56) References Cited

U.S. PATENT DOCUMENTS

| | | | |
|---|---|---|---|
| 8,028,936 B2 | 10/2011 | McDermott | |
| 8,069,747 B2 | 12/2011 | Buckingham | |
| 8,205,522 B2 | 6/2012 | Buckingham | |
| 8,277,647 B2 | 10/2012 | Rice | |
| 8,374,722 B2 | 2/2013 | Buckingham | |
| 8,571,711 B2 | 10/2013 | Jacobsen | |
| 8,758,232 B2 | 6/2014 | Graham | |
| 9,138,782 B2 | 9/2015 | Dorshimer | |
| 9,739,168 B2 | 8/2017 | Ekanayake | |
| 9,926,517 B2 | 3/2018 | Tibbetts | |
| 9,932,854 B1 | 4/2018 | Tibbetts | |
| 9,951,647 B2 | 4/2018 | Rawson | |
| 9,957,066 B2 | 5/2018 | Bewlay | |
| 9,981,392 B2* | 5/2018 | Kim | A61B 34/30 |
| 10,005,111 B2 | 6/2018 | Eriksen | |
| 10,018,113 B2 | 7/2018 | Bewlay | |
| 10,227,891 B2 | 3/2019 | Eriksen | |
| 10,323,539 B2 | 6/2019 | Bewlay | |
| 10,377,968 B2 | 8/2019 | Brooks | |
| 10,385,723 B2 | 8/2019 | Flynn | |
| 10,634,004 B2 | 4/2020 | Giljohann | |
| 10,669,885 B2 | 6/2020 | Pecchiol | |
| 10,920,181 B2 | 2/2021 | Martin | |
| 10,967,504 B2 | 4/2021 | Simaan | |
| 11,027,317 B2 | 6/2021 | Tibbetts | |
| 11,278,365 B2* | 3/2022 | Kim | A61B 34/71 |
| 11,441,446 B2 | 9/2022 | Rawson | |
| 2008/0287963 A1* | 11/2008 | Rogers | A61B 1/008 606/130 |
| 2012/0253326 A1* | 10/2012 | Kleyman | A61B 34/30 606/1 |
| 2015/0159122 A1 | 6/2015 | Tibbetts | |
| 2015/0202013 A1 | 7/2015 | Teichtmann | |
| 2017/0165721 A1 | 6/2017 | Tibbetts | |
| 2017/0167290 A1 | 6/2017 | Kulkarni | |
| 2017/0191376 A1 | 7/2017 | Eriksen | |
| 2017/0204739 A1 | 7/2017 | Rawson | |
| 2017/0254217 A1 | 9/2017 | Eriksen | |
| 2017/0281296 A1 | 10/2017 | Cooper et al. | |
| 2018/0149038 A1 | 5/2018 | Eriksen | |
| 2018/0155060 A1 | 6/2018 | Dauenhauer | |
| 2018/0216036 A1 | 8/2018 | Tibbetts | |
| 2018/0237163 A1 | 8/2018 | Bewlay | |
| 2018/0245477 A1 | 8/2018 | Kulkarni | |
| 2018/0258787 A1 | 9/2018 | Tibbetts | |
| 2018/0291803 A1 | 10/2018 | Belay | |
| 2018/0298781 A1 | 10/2018 | Tibbetts | |
| 2018/0313225 A1 | 11/2018 | Millhaem | |
| 2018/0355751 A1 | 12/2018 | Tibbetts | |
| 2019/0153890 A1 | 5/2019 | Eriksen | |
| 2019/0323378 A1 | 10/2019 | Tibbetts | |
| 2021/0108537 A1 | 4/2021 | Rigg | |
| 2021/0267702 A1 | 9/2021 | Kim et al. | |
| 2021/0317752 A1 | 10/2021 | Deja | |
| 2023/0191610 A1 | 6/2023 | Norton | |

FOREIGN PATENT DOCUMENTS

| | | |
|---|---|---|
| DE | 102013202616 A1 | 8/2014 |
| DE | 102015006330 | 11/2016 |
| KR | 20110036800 | 4/2011 |
| KR | 20130110973 | 10/2013 |
| WO | 2020022474 A1 | 1/2020 |
| WO | 2020030516 A1 | 2/2020 |

OTHER PUBLICATIONS

Suh, et al., "Design Considerations for a Hyper-Redundant Pulley-less Rolling Joint With Elastic Fixtures", IEEE/ASME Transactions on Mechatronics, vol. 20, No. 6, Dec. 2015; pp. 2841-2852.

* cited by examiner

SNAKE-ARM ROBOT AND JOINT THEREFOR

TECHNICAL FIELD

The present subject matter relates generally to a robotic arm for inspecting an environment and/or performing maintenance operations on a component within the environment, such as within a space inside a turbine engine, and more particularly to a snake-arm robot and a joint therefor.

BACKGROUND

Confined environments, such as gas turbine engines, require specialized tools for inspection and maintenance. At least certain gas turbine engines include, in serial flow arrangement, a compressor section including a low pressure compressor and a high-pressure compressor for compressing air flowing through the engine, a combustor for mixing fuel with the compressed air such that the mixture may be ignited, and a turbine section including a high pressure turbine and a low pressure turbine for providing power to the compressor section.

Within one or more of the sections, at least certain gas turbine engines define openings to allow insertion of tools, such as borescopes and robotic arms. These openings may vary in size, such that specialized insertion tools must be utilized with each annular opening to extend around and through such annular openings.

BRIEF DESCRIPTION OF DRAWINGS

Various needs are at least partially met through provision of the snake-arm robot and joint therefor described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
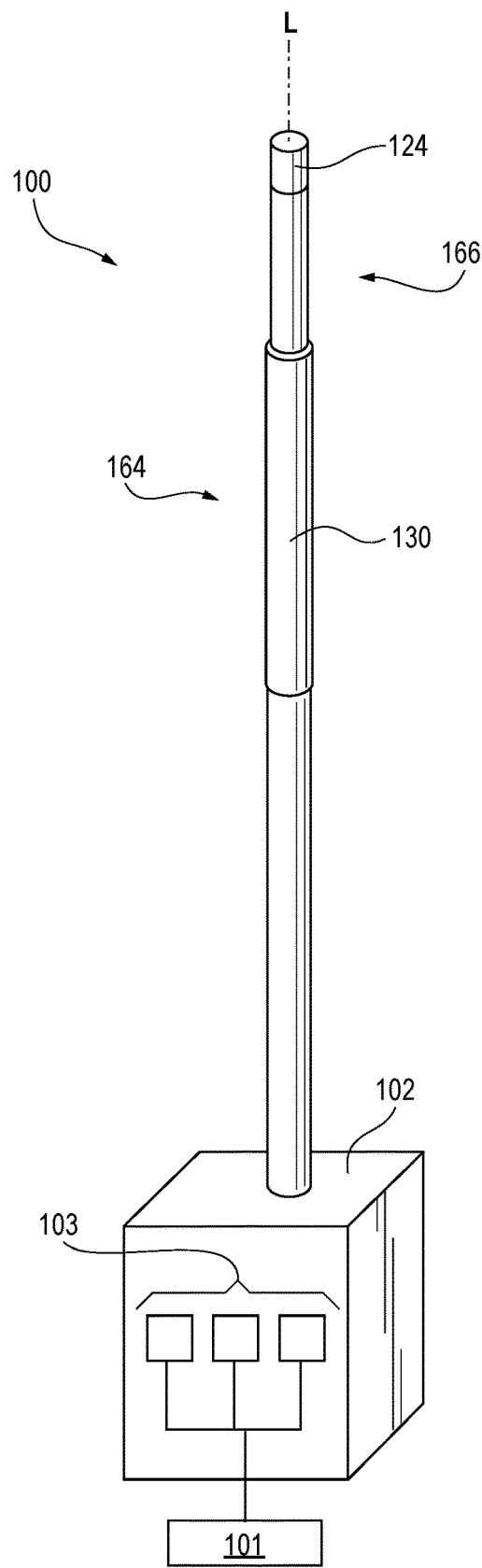
FIG. 1 comprises a perspective view of a robot arm assembly as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Robotic arms such as snake-arm robots are long and slender and have articulations along their length so that the snake-arm robot can bend in a manner resembling a snake. Features typically associated with snake-arm robots include having a self-supporting arm that is driven by tension members, such as control wires, tendons or wire ropes. At least certain snake-arm robot assemblies include a plurality of links joined together at respective joints. Additionally, a plurality of control wires or ropes may extend through the arm, with one or more ropes terminating at individual links for moving such links relative to an aft- or proximally adjacent link. The ropes may be coupled to one or more motors within a base of the snake-arm assembly, such that the snake-arm assembly may control a movement of the arm by selectively increasing and/or decreasing tension on one or more of the plurality of control wires. Due to their shape and control characteristics, snake-arm robots are typically used to access and perform work in confined spaces.

Snake-arm robots are often used in association with an introduction device that introduces the snake-arm into a confined space. For example, a snake-arm robot may be mounted onto a remote-controlled vehicle or may be mounted onto an industrial robot that can be used as the introduction device. In such cases, the shape of the arm is coordinated with the linear movement of the introduction device axis enabling an operator to control the arm and the robot head of the snake-arm robot to follow a path into a workspace or confined space to function and/or do work.

The ability of snake-arm robots to pass through small apertures and move through cluttered environments and/or reach into confined spaces allows such robots to be utilized in many applications involving access problems. For example, a snake-arm robot can be used to work in confined spaces in industrial environments or hazardous environments. In addition, a snake-arm robot can carry or be equipped with various types of tools and/or robot heads designed to do work. Thus, a snake-arm robot may be utilized to inspect, repair and/or maintain parts in a wide variety of environments.

Snake-arm robots are long, slender robot arms which are operated by a number of tension members, which may also be referred to as control wires, wire ropes, ropes, cables, tendons, lines, etc. terminating at points along the length of the robot arm. The tension members are tensioned or pulled using actuators, such as motors at the base of the arm. The number of tension members is typically 1.5 or 2 times the number of degrees of freedom of the arm. For a lightweight arm, the tension in the tension members and pre-load may be similar for all the tension members in the arm. The compression force at the base of the column of links making up the arm is the sum of the tension in each of the tension members. For some snake-arm robots, the compression force can exceed 500 times the arm payload.

Snake-arm robots capable of bending in multiple directions are typically constructed with Hooke's joints or universal joints between links, and the tension members are arranged in a ring around ends of each link to span the joint. The line of action of the compression on the base of the arm, resulting from the tension in the tension members, gives rise to a loading limit, and a corresponding stiffness and payload limit, due to elastic instability of the column of links. This loading limit is calculable and has been observed as a limiting factor in known snake-arm robots and present significant challenges, including in the context of aviation and industrial settings.

Through investigation of the locus of the line of action of the tension members in a snake-arm robot during joint bending, the inventors have discovered that the contact surfaces of a generally cylindrical or spherical rolling joint can be sized and configured such that a line of action of the compressive forces acting on the joint remain coincident with the point of contact between the contact surfaces, or if there are multiple points of contact, with a reference line extending between or through the points of contact along an entire range of motion of the joint.

Generally speaking, the various aspects of the present disclosure can be employed with a robot arm including a first proximal link and a second distal link and a joint therebetween that includes convex contact portions that are in rolling contact with one another to allow the first and second links to pivot with respect to one another. The convex contact portions are configured to contact one another at first and second contact points corresponding to a first orientation of the first and second links. The first and second convex contact portions are also configured to contact one another at third and fourth contact points corresponding to a second orientation of the first and second links. The joint is configured such that a line of action of a net force acting on the joint is incident with a first reference line extending between the first and second contact points when the first and second links are in the first orientation, and the line of action of the net force acting on the joint is incident with a second reference line extending between the third and fourth contact points when the first and second links are in the second orientation.

In some embodiments, first and second tension members each extend through the first link and at least a portion of the second link. The first and second tension members are fixed relative to the second link to allow the second link to be pivoted relative to the first link by pulling in one of the first and second tension members proximally and paying out an other of the first and second tension members distally. The first and second tension members each have a free length that spans the joint between the first and second links. A first reference line extending between the first and second contact points when the first and second links are in the first orientation is equidistant from each of the free lengths of the first and second tension members, and a second reference line extending between the third and fourth contact points when the first and second links are in the second orientation is also equidistant from each of the free lengths of the first and second tension members. In some embodiments, the through openings in the links through which the tension members extend can be sized and configured to control how the tension member bends as it extends from one link to another. In some embodiments, the through openings have proximal and distal portions that are enlarged relative to an intermediate portion extending therebetween. The intermediate portion in some forms has a constant diameter. In some forms, the proximal portion of the through openings widens progressively along a proximal direction and the distal portion of the through openings widens progressively along a distal direction.

By configuring the robot arm in the above-referenced manner, elastic instability is reduced or eliminated. In addition, payload capacity and stiffness of the robot arm is increased. Further, the robot arm can be reduced in complexity and be further miniaturized to allow access to smaller or more confined environments. The range of motion of each joint can also be increased compared to a Hooke's joint of similar dimensions.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Figure 2:
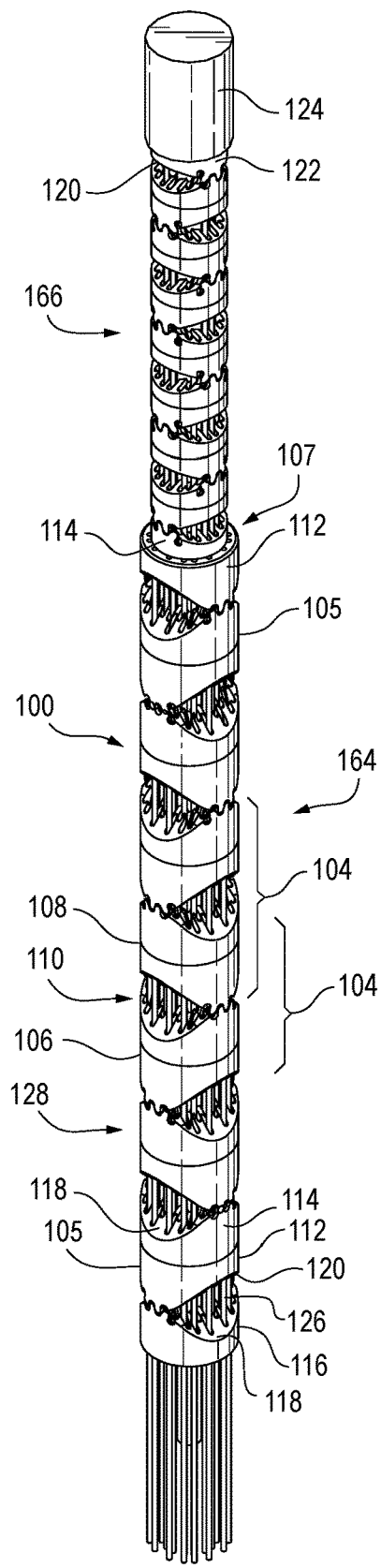
FIG. 2 comprises a perspective view of the robot arm assembly of FIG. 1 with an outer skin of the robot arm removed to show a plurality of sequentially arranged and articulated links in a neutral configuration as configured in accordance with various embodiments of these teachings.

The foregoing and other benefits may become clearer upon making a thorough review and study of the following detailed description. Referring now to the drawings, and in particular to FIGS. 1 and 2, an illustrative snake-arm robot 100 that is compatible with many of these teachings will now be presented.

The snake-arm robot 100 is shown in a neutral, aligned position with an elongated body that extends along a longitudinal axis L from a base 102. The body of the snake-arm robot 100 is formed by a column of sequentially arranged and articulated segments 104 (two of which are referenced in FIG. 2), each segment being formed by pairs of adjacent links 105 (two of which are referenced in FIG. 2) including a relatively proximal link 106 and a relatively distal link 108 having a joint 110 therebetween for allowing the links 106, 108 to shift, pivot or bend with respect to one another. Each link 105 may have a body formed of separate proximal and distal link portions 112, 114 that are connected or fixed to one another, or may have a monolithic, unitary body, such as shown in FIGS. 7-12. In some embodiments, the links 105 may be manufactured through electrical discharge machining (EDM), machining and additive manufacturing processes, such as Direct Metal Laser Melting (DMLM) and Direct Metal Laser Sintering (DMLS). As is evident from FIG. 2, immediately adjacent segments 104 overlap and share links such that the proximal link 106 of one segment 104 may be the distal link 108 of an immediately proximal segment, and the distal link 108 of the same segment 104 may form the proximal link 106 of an immediately distal segment 104. Accordingly, links 106, 108 may be referred to herein as first, second, third, proximal, distal, etc.

The movement of the links 105 is controlled by tension members or ropes 126 that extend through and terminate at individual ones of the links 105. In some embodiments, at least two ropes 126 terminate at or in each distal link 108 of a segment 104 for shifting the link 108 relative to the respective proximal link 106. In some embodiments, four ropes 126 terminate at every second link 108, such that every other link 105 may have no ropes fixed thereto. In other embodiments, three ropes 126 may be terminated at every second link 108. In some embodiments, the ropes 126 that are terminated at individual links 105 are approximately spaced apart from one another by equal distances. In some embodiments where two ropes 126 are terminated at a link 105, the ropes 126 are diametrically opposed from one another.

The ropes 126 extend from the base 102 and are selectively payed out or drawn in via one or more actuators 103, such as electric motors and/or linear actuators, to tension or de-tension the ropes. The ropes 126 may be coupled to pulleys, drums, spools, reels and/or windlasses for changing the path of the ropes within the base 102. In some embodiments, a pair of ropes 126 terminated at a link 105 may be rope portions of a single rope 126 that extends about a pulley driven by a single motor. A controller 101 is operably coupled to the one or more actuators 103 for controlling operation of the snake-arm robot 100. Additionally, the controller 101 may be operably coupled to a head portion 124 and/or one or more sensors, cameras, tools, or devices (not shown) attached to or embedded in one or more of the links 105 of the snake-arm robot 100 and/or the head portion 124.

Figure 3:
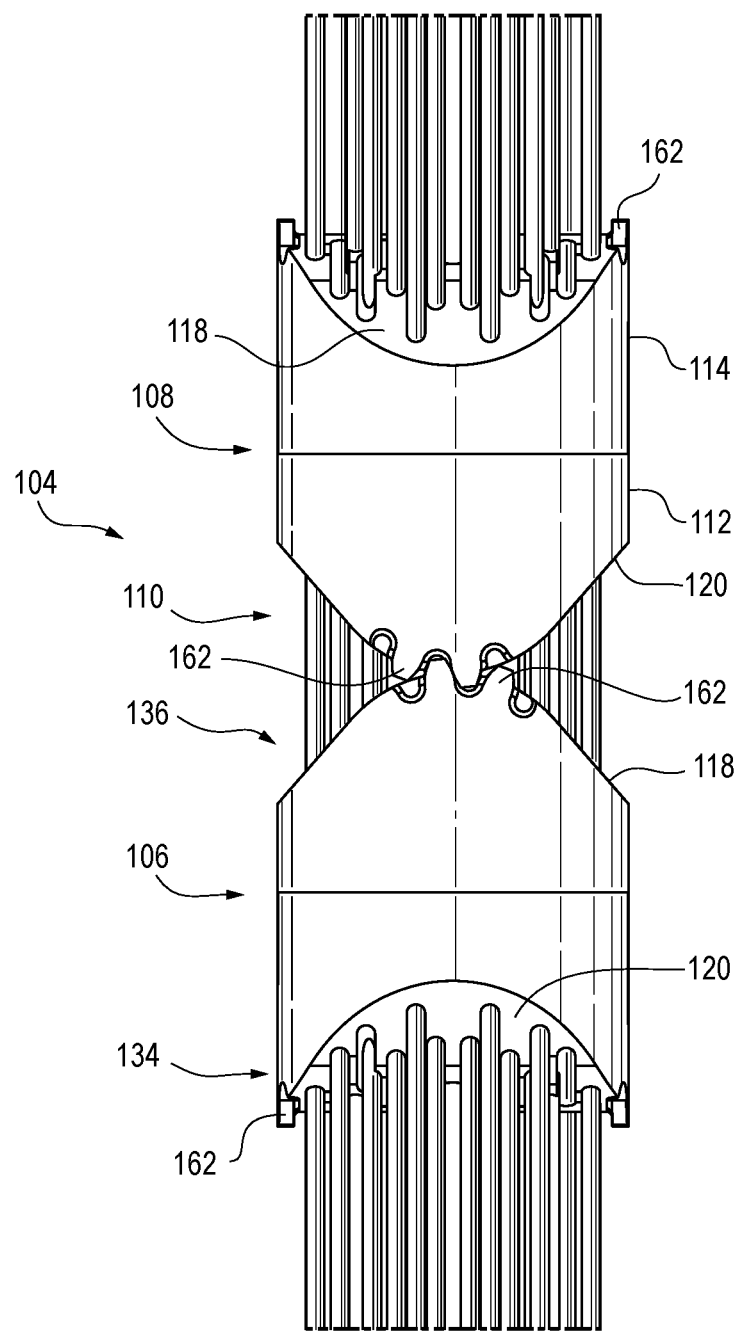
FIG. 3 comprises an enlarged elevation view of a segment of a proximal portion of the robot arm assembly of FIG. 2 including adjacent proximal and distal links as configured in accordance with various embodiments of these teachings.

In the embodiment shown in FIG. 2, the snake-arm robot 100 includes 16 joints 110, with each joint having a single degree of freedom, although in other forms there may be more or fewer joints, and each joint may have one or two degrees of freedom. As shown in FIGS. 1 and 2, the arm of the snake-arm robot 100 includes a larger diameter proximal portion 164 and a smaller diameter distal portion 166. The links 105 of the larger diameter proximal portion 164 (See FIGS. 3-5) are similar to the links 105 of the smaller diameter distal portion 166 (See FIG. 6), except for having a larger size and an increased number of through openings 132 to allow additional ropes 126, including ropes that are fixed to the links 105 of the smaller diameter distal portion 166, to extend therethrough. At the transition between the larger diameter proximal portion 164 and the smaller diameter distal portion 166, a transitional link 107 includes a larger proximal link portion 112 connected to a smaller distal link portion 114. As but one example to demonstrate the relatively small size of one embodiment of the snake-arm robot 100, the links 105 of the smaller diameter distal portion 166 may have a diameter of approximately 6 mm, such as 6.2 mm, and the links 105 of the larger diameter proximal portion 164 may have a diameter of approximately 8 mm. The arm portion of the snake-arm robot 100 in this form may have a length of approximately 98 mm or less than four inches.

Figure 4:
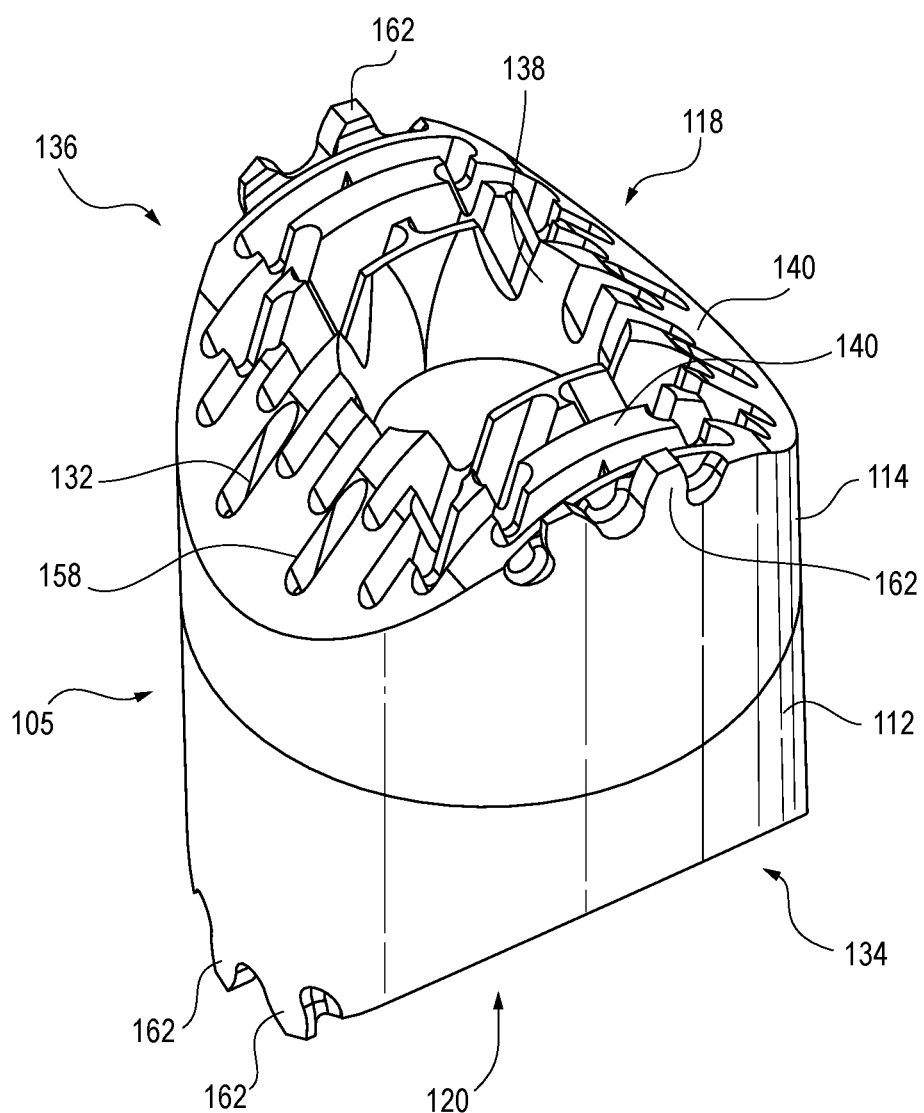
FIG. 4 comprises a perspective view of the proximal link of the segment of the robot arm assembly of FIG. 3 as configured in accordance with various embodiments of these teachings.
Figure 5:
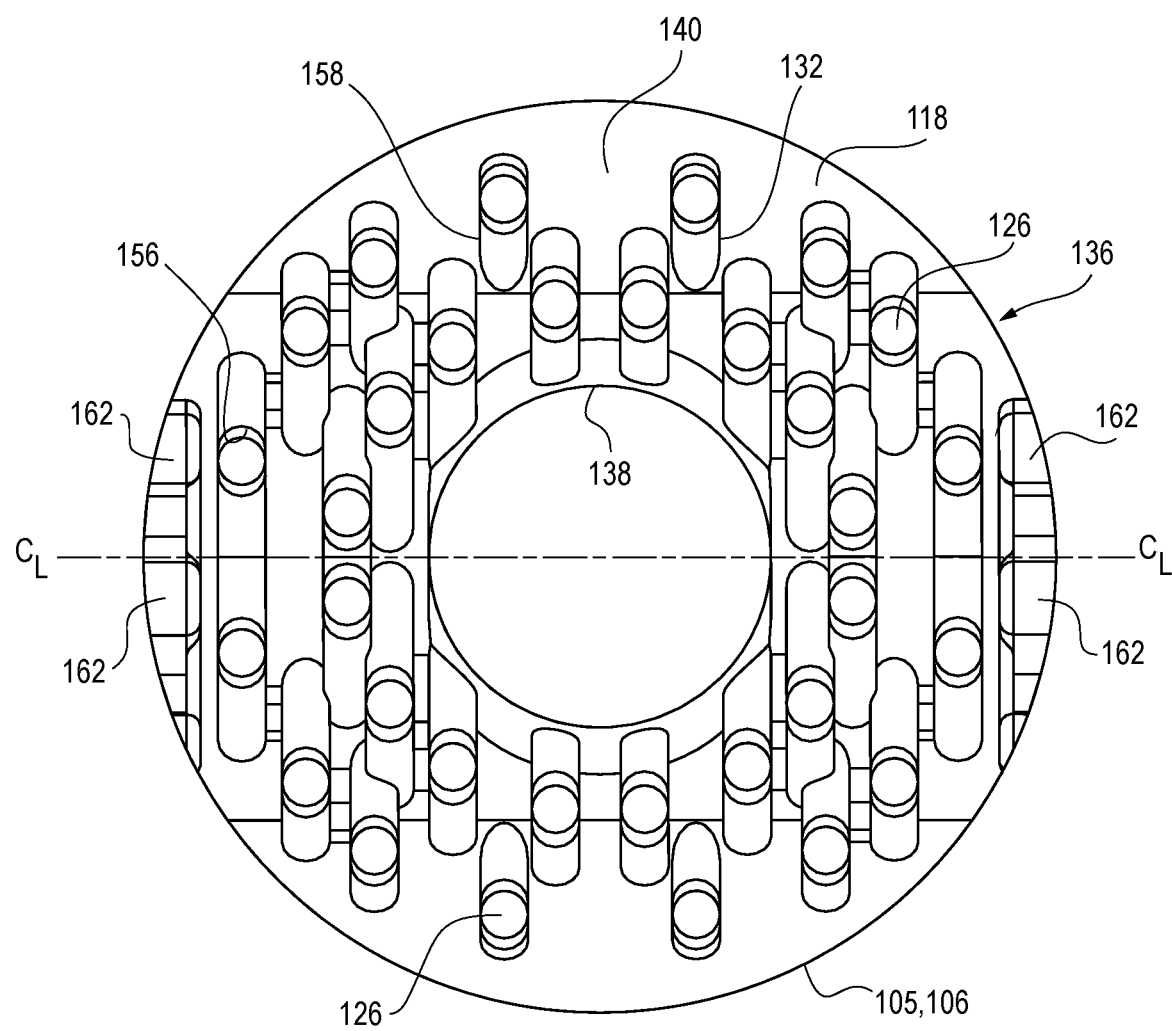
FIG. 5 comprises a plan view of the link shown in FIG. 4 illustrating the tension members extending axially in the through openings extending through the link as configured in accordance with various embodiments of these teachings.
Figure 6:
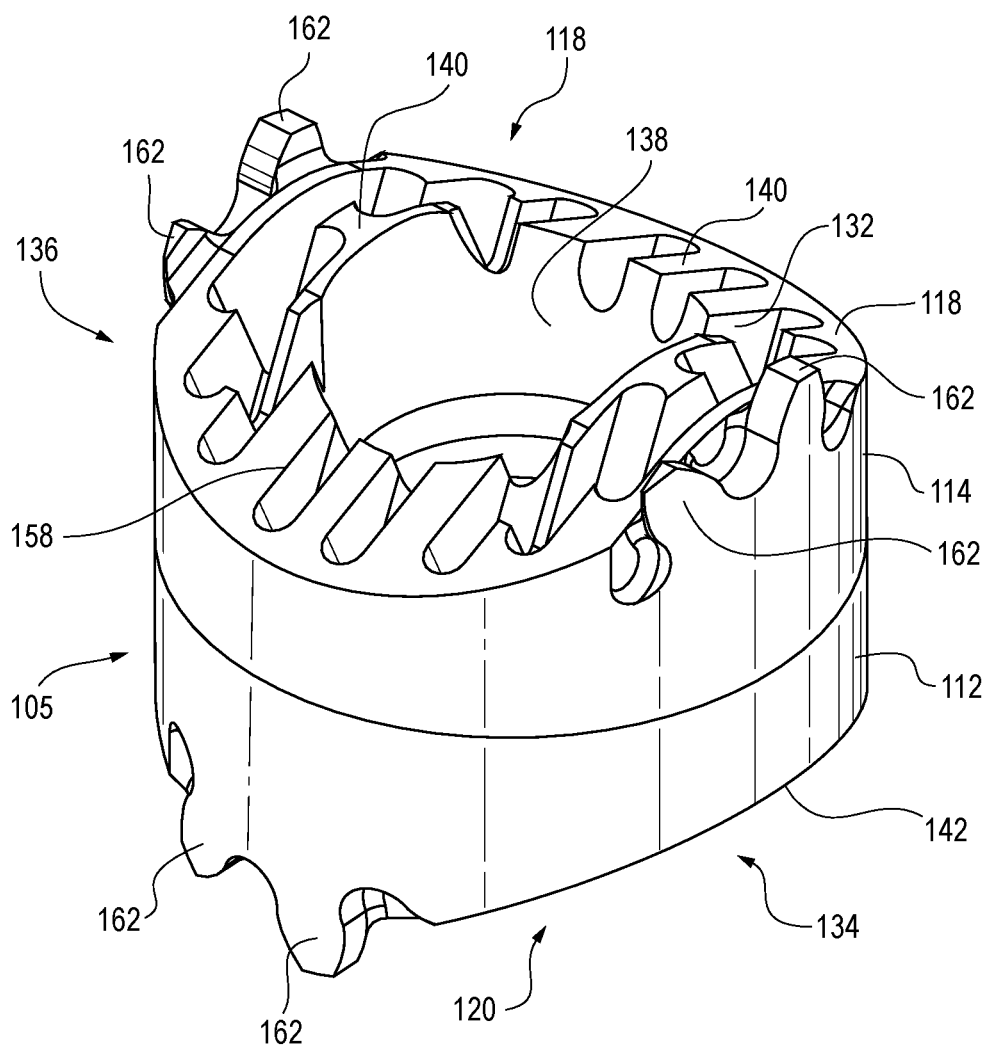
FIG. 6 comprises a perspective view of a link of the smaller distal portion of the robot arm assembly of FIG. 2 as configured in accordance with various embodiments of these teachings.

In some embodiments, such as shown in FIGS. 4 and 5, the links 105 of the larger diameter proximal portion 164 include a plurality of through openings 132 arranged in a pattern of two concentric rings, while the links 105 of the smaller diameter distal portion 166, such as shown in FIG. 6, have only a single ring pattern of through openings 132. Generally, the ropes 126 extending through the inner ring pattern of through openings 132 of the links 105 of the larger diameter proximal portion 164 continue on to the links of the smaller diameter distal portion 166.

The ropes 126 may be fixed relative to individual links 105 in any of a variety of manners. In some embodiments, a crimp member, such as a cylindrical crimp sleeve, is attached to the rope 126 by plasticly deforming the crimp member while the rope extends therethrough. In some embodiments, a counterbore may be formed as part of the through openings 132 in the link 105 to receive the crimp member. In other embodiments, the link 105 itself may be locally deformed adjacent to through opening 132 to reduce the diameter of the through openings 132 so as to grip the rope 126 extending therein. In other embodiments, the ropes 126 may be thermally brazed within the through openings 132 using a braze metal filler such as bronze. In some embodiments, the ropes 126 may be looped within the through openings 132 to create enough friction with the sidewalls of the through openings 132 to hold the end of the ropes 126 in place. In particular, the ropes 126 are sufficiently stiff such that a U-turn of the rope loops within a closely sized through opening 132 creates a reaction force due to the loop-back, and capstan friction from the loop increases the holding force available. In other embodiments, the ropes 126 may be bonded to the sidewalls of the through openings 132 using an adhesive. In other embodiments, the ends of the ropes 126 can be inserted through the through openings 132 causing the rope ends to unravel slightly. The rope ends can then be coated with an adhesive, braze or solder to bulk up the monofilaments of the ropes 126, and then the rope ends can be pulled back into the through openings 132 to create a wedging action. In other forms, a spike can be driven into the rope end in the through opening 132 to wedge the end of the rope 126 in the through opening 132. In other embodiments, a tapered collet may be fitted to the rope 126 and inserted into the through opening 132 such that the tension on the rope 126 pulls the collet into engagement with the sidewall of the through opening and wedges the assembly together.

In some embodiments as shown in FIG. 1, the links 105 are surrounded by an exterior skin 130 which may be formed of a flexible material, such as an elastomeric sleeve made of silicone rubber or another synthetic rubber, a natural rubber compound or another elastomer having a large strain capacity, a corrugated, thin-walled sleeve made of a thin metal such as copper, beryllium copper or stainless steel in such a way to act flexibly in bending like a gaiter, or a braided jacket comprising discreet fibers woven in different directions, made of metallic or polymeric materials such as stainless steel, Nitinol, beryllium copper and the like. The exterior skin 130 is configured to protect and to prevent fouling of the components of the snake-arm robot 100, including the joints 110 and ropes 126, from foreign materials in the environment and to allow the segments 104 to bend.

As shown in FIG. 2, the snake-arm robot 100 includes a plurality of links 105 including a base link 116 at the proximal end of the robot arm assembly, a distal tip link 122 at the distal end of the robot arm assembly, and a plurality of intermediate links 128 between the base link 116 and the distal tip link 122. The base link 116 includes a distal rolling contact portion 118 for engaging with a proximal rolling contact portion 120 of an immediately adjacent link 105. The intermediate links 128 have both a distal rolling contact portion 118 and a proximal rolling contact portion 120. The distal tip link 122 includes a single proximal rolling contact portion 120. The head portion 124 at the distal end of the snake-arm 100 is positioned distally adjacent to the distal tip link 122 and may include an end effector, tools, such as rotary tools for grinding or bore blending, sensors, such as an eddy current sensor, cameras, light sources, nozzles for introducing fluids, and the like.

Figure 7:
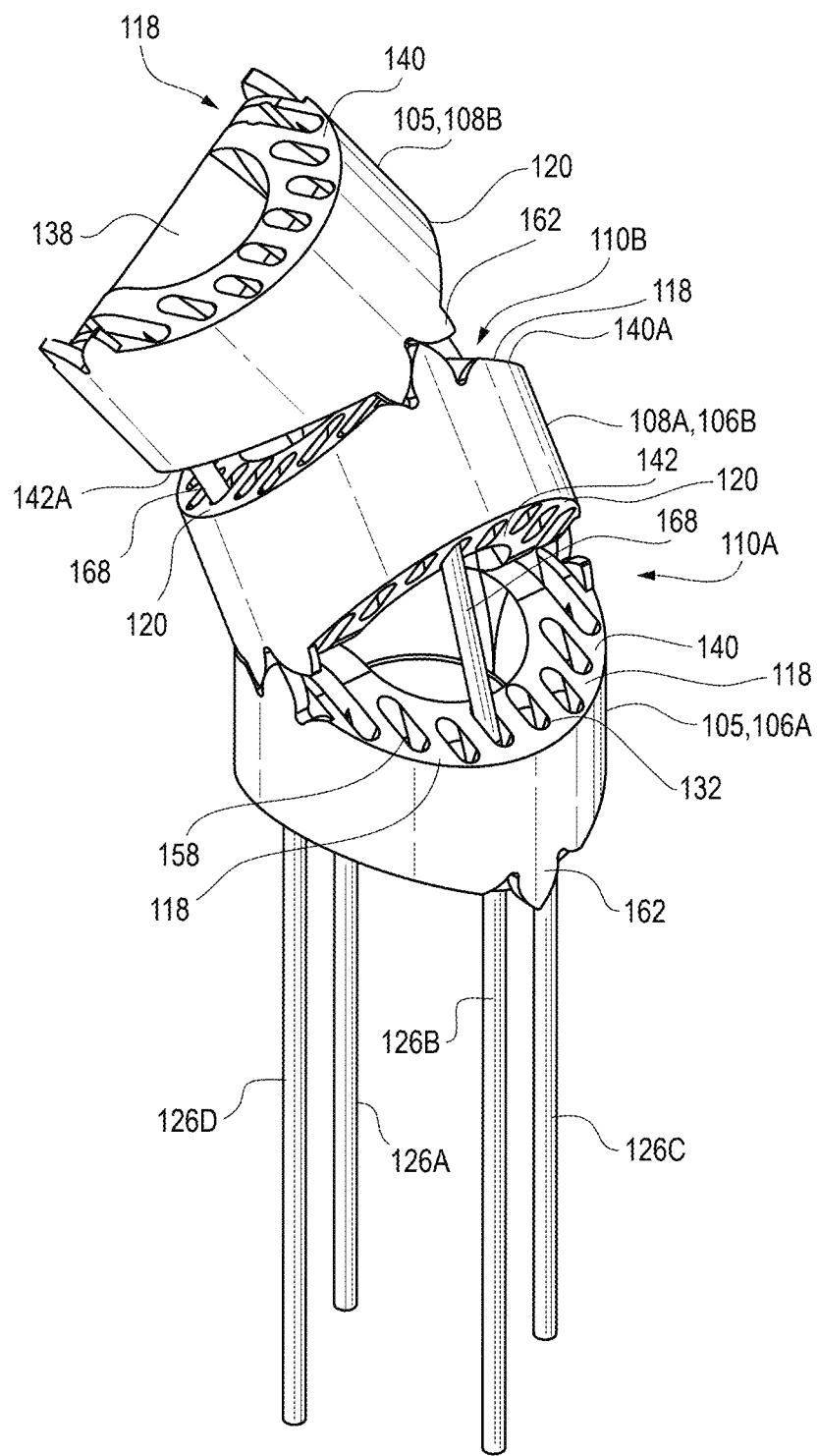
FIG. 7 comprises a perspective view of a portion of another robot arm including a lower, proximal joint formed by a proximal first link and an intermediate second link in a first orientation and an upper, distal joint formed by the intermediate second link and a distal third link in a second orientation as configured in accordance with various embodiments of these teachings.
Figure 12:
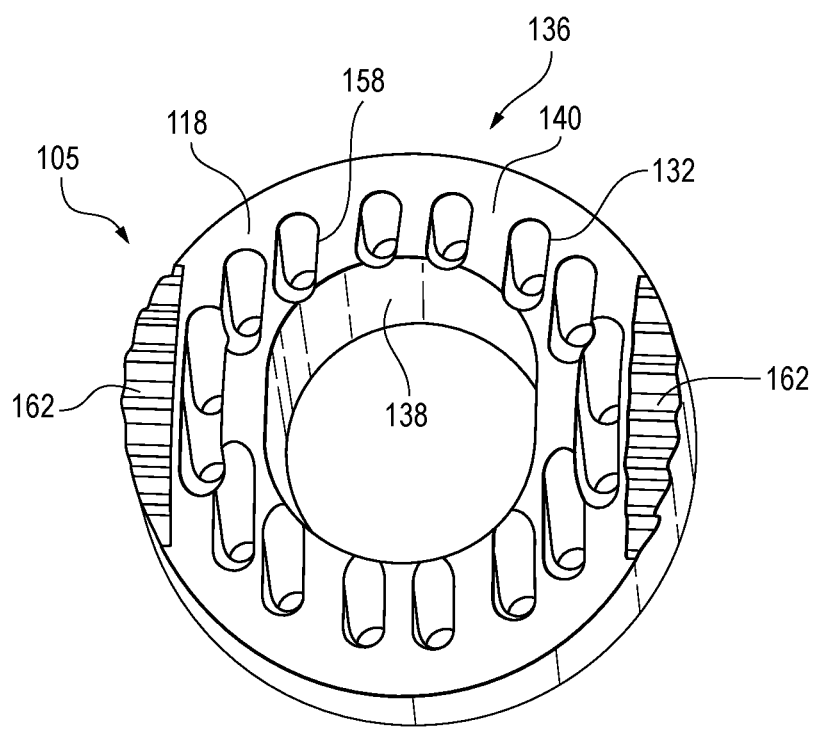
FIG. 12 is a perspective view of an alternative link as configured in accordance with these teachings.

A joint 110 is formed by adjacent first and second links 106, 108 at a distal rolling contact portion 118 of the first proximal link 106 and proximal rolling contact portion 120 of the second distal link 108. As shown in FIG. 7, the distal rolling contact portion 118 includes at least a first convex contact surface 140 of the first link 106 and the proximal rolling contact portion 120 includes at least a second convex contact surface 142 of the second link 108. The first and second convex contact surfaces 140, 142 are configured to be in rolling contact with one another to allow the first and second links 106, 108 to pivot with respect to one another. As shown in FIG. 6, for the intermediate links 128, the convex contact surfaces 140, 142 are formed at each of distal end 136 and the proximal end 134 of each link 105. In some forms, such as shown in FIGS. 4-6, the rolling contact portions 118, 120 of the first and second link 106, 108 each comprise a plurality of convex contact surfaces 140, 142. In some embodiments, an entirety of the contact portions 118, 120, including the first and second contact surfaces 140, 142 thereof, are convex, such that no portion of the portions or surfaces thereof is concave. The contact portions 118, 120 may each be formed by a single contiguous convex contact surface 140, 142, as shown in FIG. 12, or the contact portions 118, 120 may be formed by a plurality of noncontiguous convex contact surfaces 140, 142, such as shown in FIGS. 4-6.

Figure 8:
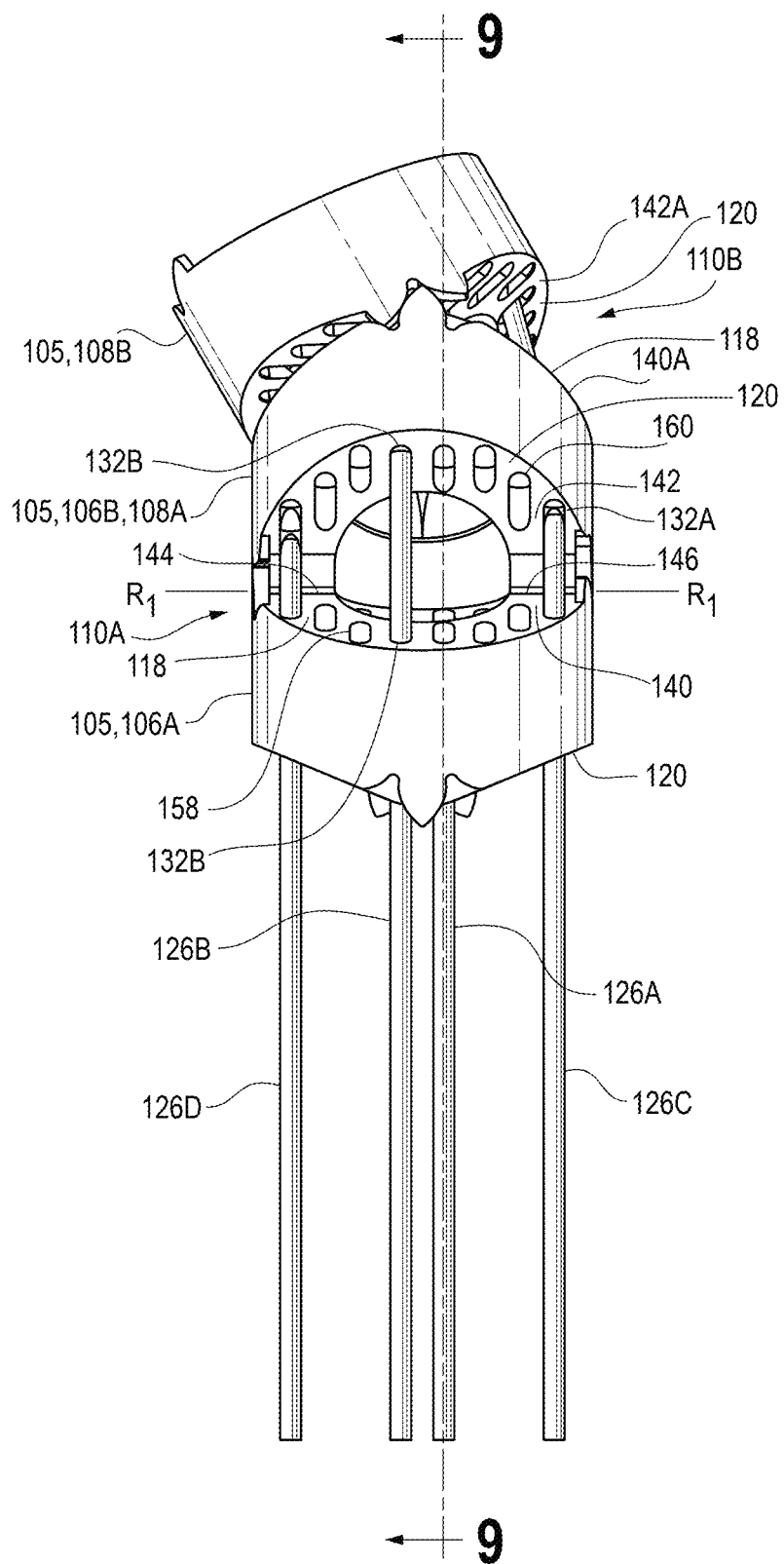
FIG. 8 is an elevational view of the portion of the robot arm of FIG. 7 as configured in accordance with various embodiments of these teachings.

Now referring to FIGS. 7-11, three links 105 are shown that form two joints 110, an upper or distal joint 110B and a lower or proximal joint 110A. The middle link 105 forms both the distal link 108A of the lower joint 110A and the proximal link 106B of the upper joint 110B. The links 106, 108 forming the lower joint 110A are shown in a first pivoted orientation, and the links 106, 108 forming the upper joint 110B are positioned in a second pivoted orientation with respect to one another. Now referring to the lower joint 110A, the first and second convex contact surfaces 140, 142 of the first and second contact portions 118, 120 are configured to contact one another at first and second contact points 144, 146 at the first and second convex contact surfaces 140, 142 corresponding to a first orientation of the first and second links 106, 108. The first and second contact points 144, 146 are positioned opposite from another on either side of the central opening 138, as best shown in FIG. 8. In some embodiments, the first and second contact points 144, 146 may be arbitrarily positioned on a line contact, particularly where the first and second convex contact surfaces 140, 142 are part of corresponding cylindrical convex contact surfaces. In some embodiments, while the distribution of contact pressure between the convex contact surfaces 140, 142 is nominally linear, in reality the line will have some relatively small real width due to the action of the pressure and the elasticity of the materials comprising the links and the resulting deformation of the contact surfaces, while the distribution of contact pressure in the direction of the nominal line of contact will be uneven due to surface roughness, tolerances in any manufacturing processes employed, and the elastic deformation of the links 105.

In some embodiments, such as shown in FIGS. 7-11, the second or intermediate link 108A of a joints 110A, 110B includes a third contact portion 118 having a third convex contact surface 140A opposite the second convex contact surface 142 that is configured to be in rolling contact with a fourth contact portion 120 having a fourth convex contact surface 142A of the third link 108B positioned distally along the longitudinal axis from the second link 108. The second and third links 108A, 108B accordingly form the second, distal joint 110B. The third contact portion 118 is rotated 90 degrees of rotation about the longitudinal axis. However, in other forms, the third contact portion 118 may be rotated at least 30 degrees of rotation or more about the longitudinal axis L, such as 30, 45, 60, or 75 degrees of rotation about the longitudinal axis to allow the third link 105, 108 to be pivoted in a direction different than a direction the second link 108A is pivoted relative to the first link 106A. In some embodiments, the links 105 may be identically sized and configured. In this manner, the first and third contact portions 118 of adjacent links may be identically configured, and the second and fourth contact portions 120 of adjacent links may be identically configured, except that they are rotated about the longitudinal axis with respect to one another, such as by at least 30 degrees of rotation or more about the longitudinal axis L, such as 30, 45, 60, 75 or 90 degrees of rotation about the longitudinal axis.

The links 105 include a plurality of through openings or holes 132 that extend generally longitudinally between the proximal end 134 and the distal end 136 of link 105 through which ropes 126 may extend for connecting neighboring links 105 together and for shifting the orientation of the links 105 relative to one another. In some embodiments, the through openings 132 are arranged in a generally annular pattern about a larger central opening 138 that extends between proximal end 134 and distal end 136 of the link 105 along the longitudinal axis thereof for allowing passage of fluid, electrical, and/or data lines, as well as flexible drive shafts and/or other components from the base 102 to other links and/or head portion 124.

Figure 9:
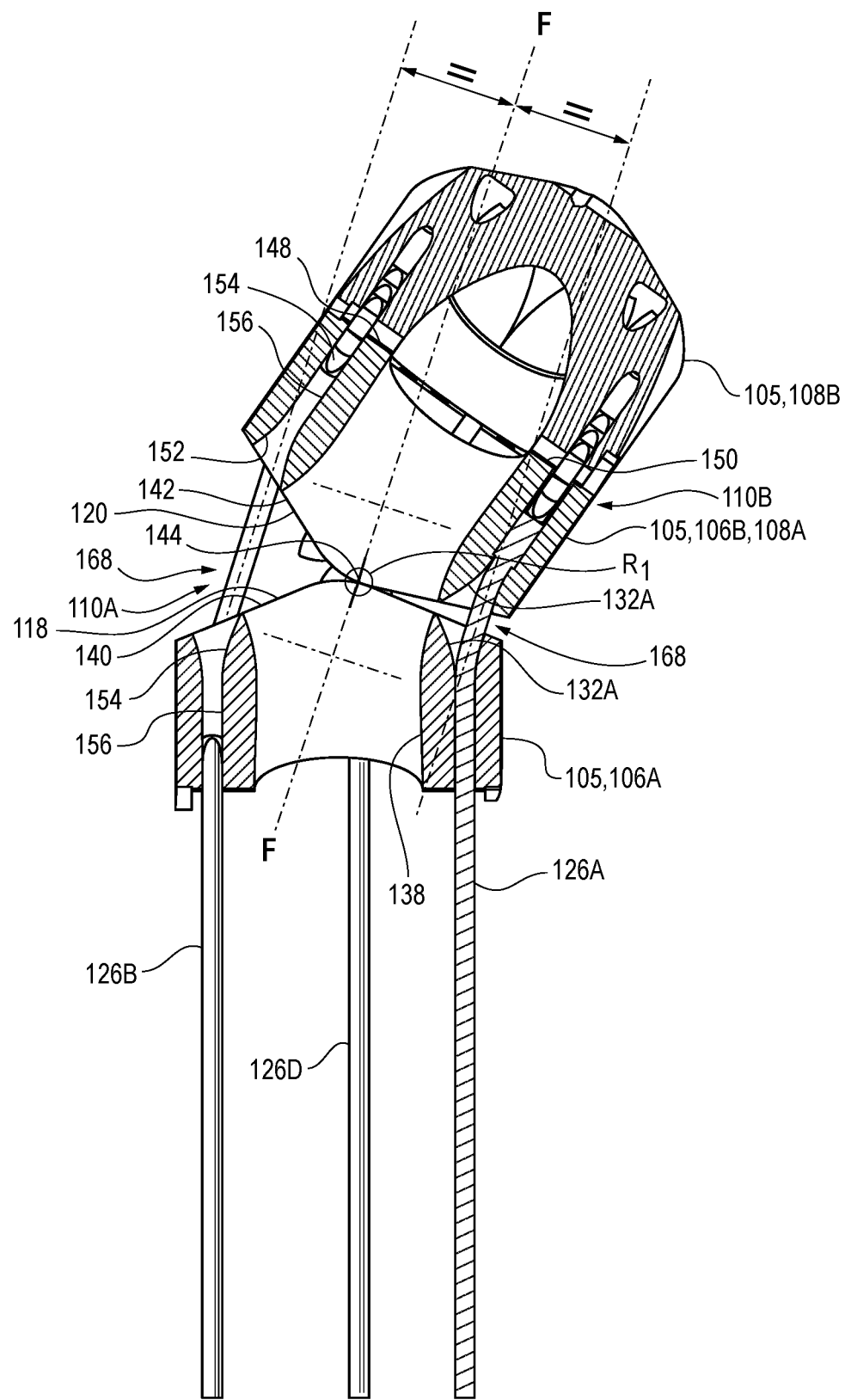
FIG. 9 is a sectional view of the robot arm portion of FIG. 8 through the line 9-9 as configured in accordance with various embodiments of these teachings.
Figure 10:
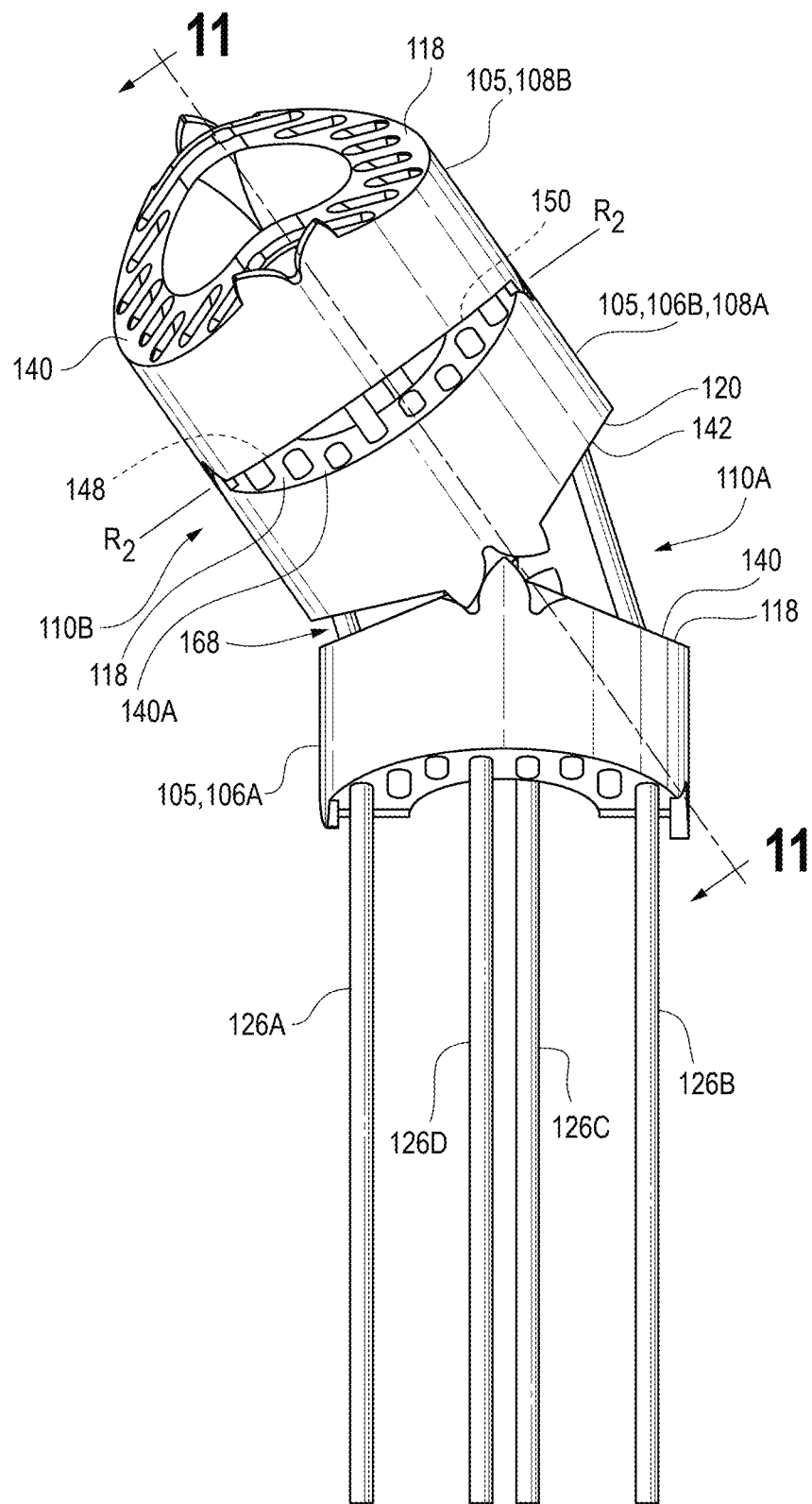
FIG. 10 is another elevational view of the portion of the robot arm of FIG. 7 as configured in accordance with various embodiments of these teachings.

It will be appreciated that bending a joint 110 is achieved by pulling in a length of rope 126 on one side of the joint, while paying out a length of rope 126 on the other side of the joint. When the length of the ropes 126 that are fixed to the distal link 108A of the joint 110A are adjusted to shift the distal link 108 relative to the neighboring proximal link 106, the links 106A, 108A will shift to a second orientation different from the first orientation, such as the orientation of the links 106B, 108B forming the upper joint 110B shown in FIGS. 10 and 11. Now referring to the upper joint 110B, the first and second convex contact surfaces 140, 142 of the first and second contact portions 118, 120 are configured to contact one another at third and fourth contact points 148, 150 at the first and second convex contact surfaces 140, 142 corresponding to a second orientation of the first and second links 106, 108. The third and fourth contact points 148, 150 are positioned opposite from another on either side of the central opening 138, as best shown in FIG. 9. In some forms, where the first and second contact portions 118, 120 each include a plurality of convex contact surface portions 140, 142, such as shown in FIGS. 4-6, the contact point pairs may be located at separate convex contact surface portions 140, 142 of each contact portion 118, 120.

As shown in FIGS. 8-11, each of the joints 110A, 110B is configured such that, when the arm 100 is stationary, a line of action of a net force F acting on the joint is incident with a first reference line $R_1$ extending between the first and second contact points when the first and second links 106, 108 are in the first orientation, and the line of action of the net force acting on the joint is incident with a second reference line $R_2$ extending between the third and fourth contact points 148, 150 when the first and second links 106, 108 are in the second orientation. The net force F acting on a joint includes all the compressive forces acting on the joint, including the net tensile forces of the ropes 126 that terminate distally from the joint, as well as the forces exerted by the payload of the robot arm 100 and the self-weight of the robot arm 100. It will be apparent to a person skilled in the art that the line of action of the net force F may cease to be coincident with the reference lines $R_1$ and $R_2$ when the arm is moving under acceleration.

In some embodiments, the first and second contact portions 118, 120 each comprise a plurality of convex contact surfaces 140, 142, wherein the plurality of convex contact surfaces of each link extend along a cylindrical contour so as to allow movement of the first and second links with respect to one another with only a single degree of freedom. In other embodiments, the convex contact surfaces 140, 142 may extend along a spherical contour such that the joint 110 has two degrees of freedom.

Figure 11:
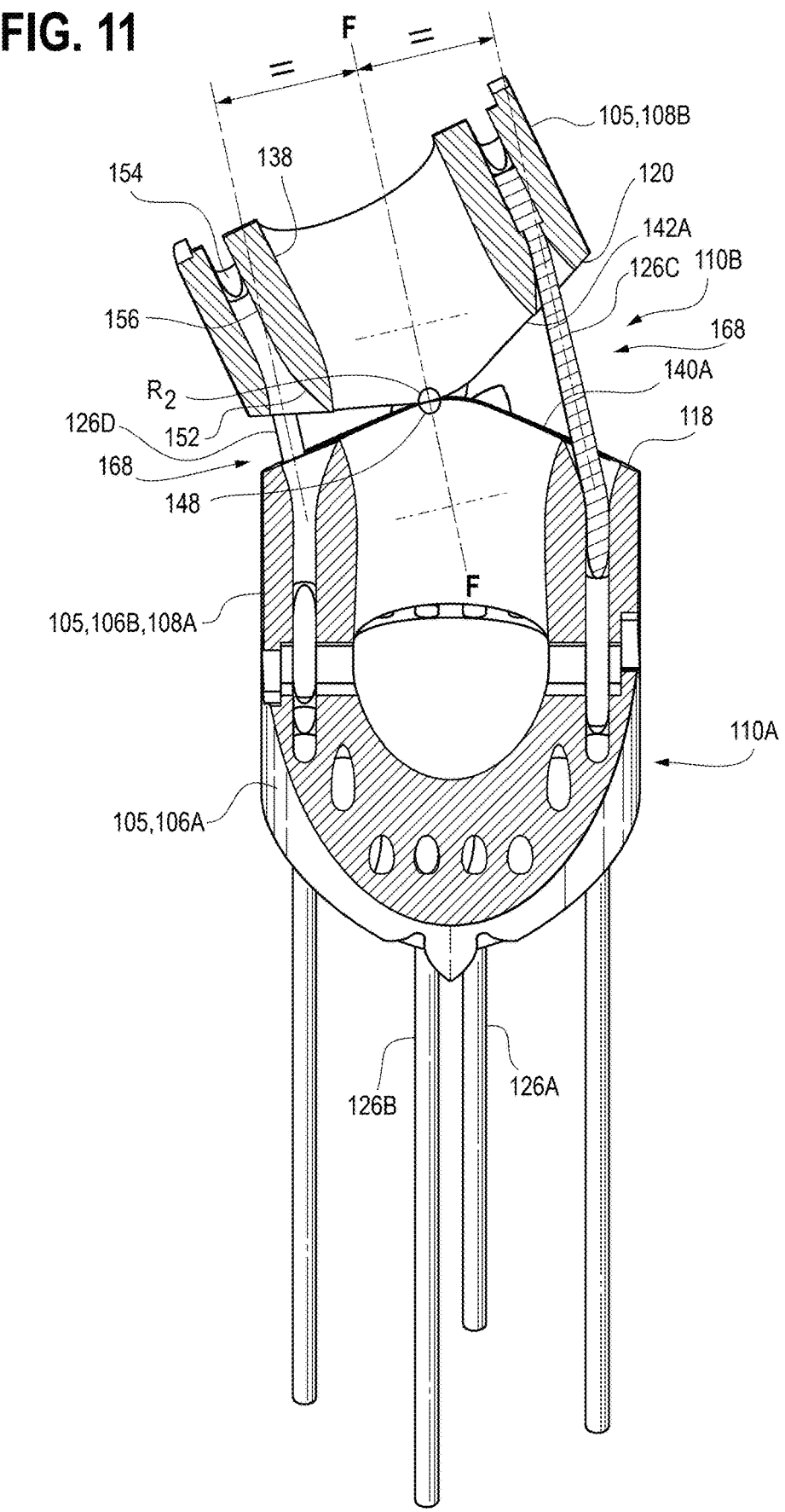
FIG. 11 is a sectional view of the robot arm of FIG. 10 through the line 11-11 as configured in accordance with various embodiments of these teachings.

In some embodiments, the links 105 each comprise a plurality of through openings 132 extending between proximal and distal ends 134, 136 thereof to allow ropes 126 to extend through the links to connect with other links 105. Accordingly, the contact portions 118, 120 and the convex contact surfaces 140, 142 thereof may be interrupted by distal and proximal end apertures 158, 160 of the through openings 132. As shown in FIGS. 9 and 11, at least one of the plurality of through openings 132 comprises proximal and distal portions 152, 154 that are enlarged relative to an intermediate portion 156 of the through opening 132 that extends between the proximal and distal portions 152, 154. In some embodiments, the intermediate portion 156 is sized to closely fit the rope 126 extending therethrough while allowing the rope 126 to shift within the through opening 132. In some embodiments, at least the intermediate portion 156 of the through opening 132 may be sized to H8 tolerances based on manufacturing tolerances of cylindrical holes through drilling or reaming. For example, there may be a diametral clearance between the rope 126 and the through opening 132 of about 25 to 50 microns, or 1 to 2 thousandths of an inch, or less than about 1%, or less than about 2% of the diameter of the rope 126.

In some embodiments, the links 105 include at least one alignment feature configured to inhibit sliding of the first and second contact portions 118, 120 with respect to one another. In one form, the alignment feature includes a one or more projections, such as a gear tooth or teeth 162 of the first link 106 and a corresponding gear tooth or teeth 162 of the second link 108 that are configured to engage with one another when the first and second links are shifted with respect to one another between different orientations or joint angles. In some embodiments, such as shown in FIGS. 3-6, the gear teeth 162 are involute gear teeth. In some embodiments, the gear tooth or teeth of each of the first and second links are disposed along an outer periphery of the first and second links 106, 108, such as on opposite sides of each of the proximal end 134 and the distal end 136. Other alignment features may be utilized, such as straps and/or elastic members that extend longitudinally between the links.

In some embodiments, the snake-arm robot 100 includes a proximal first link 106A and a distal second link 108A positioned adjacent to one another along a longitudinal axis of the robot arm, as shown in FIGS. 7-11. A proximal joint 110A is formed between the first and second links 106A, 108A comprising a first contact portion 118 including a first convex contact surface 140 of the first link 106A and a second contact portion 120 including a second convex contact surface 142 of the second link 108A. The first and second convex contact surfaces 140, 142 are configured to be in rolling contact with one another to allow the first and second links 106A, 108A to pivot with respect to one another. As shown in FIGS. 8 and 9, the first and second convex contact surfaces 140, 142 are configured to contact one another at first and second contact points 144, 146 at the first and second convex contact surfaces 140, 142 corresponding to a first orientation of the first and second links 106A, 108A. Now referring to FIGS. 10 and 11 and particularly the upper joint 110B formed by the intermediate link 106B and distal most link 108B for illustration purposes, the first and second contact portions 118, 120 including the first and second convex contact surfaces 140, 142 of links 106B, 108B are configured to contact one another at third and fourth contact points 148, 150 at the first and second convex contact surfaces 140, 142 corresponding to a second orientation of the first and second links 106B, 108B, wherein the second orientation is different from the first orientation. It will be understood that the three links 105 forming joints 110A and 110B are capable of similar rotational motion with respect to the other link of each joint, except that the direction of rotation of the distal link in each case is oriented in a different direction relative to the longitudinal axis, such as 90 degrees as shown in the embodiment of FIGS. 7-11.

Referring again to FIGS. 8 and 9, a first tension member 126A extends through the first link 106A and at least a portion of the second link 108A. A second tension member 126B extends through the first link 106A and at least a portion of the second link 108A. The first and second tension members 126A, 126B are fixed relative to the second link 108A to allow the second link 108A to be pivoted relative to the first link 106A by pulling in one of the first and second tension members 126A proximally and paying out an other of the first and second tension members 126B distally.

In some embodiments, first and second through openings 132A, 132B extend through each of the first and second links 106A, 108A. A first tension member 126A extends through the first through opening 132A of the first link 106A and at least partially through the first through opening 132A of the second link 108A. A second tension member 126B extends through the second through opening 132B of the first link 106A and at least partially through the second through opening 132B of the second link 108A. The first and second tension members 126A, 126B are fixed relative to the second link 108A to allow the second link 108A to be pivoted relative to the first link 106A by pulling in one of the first and second tension members 126A proximally and paying out an other of the first and second tension members 126B. In particular, as shown in FIG. 9, first tension member 126A is pulled in proximally and second tension member 126B is payed out distally to pivot the intermediate link 108A to the right as shown in FIG. 9. In some embodiments, the length of one of the first and second tension members 126A that is pulled in is equal to the length of the other of the first and second tension members 126B that is payed out. In some embodiments, a third tension member 126C extends through the first and second links 106A, 108A and at least partially through a third link 108B that is distally adjacent to the second, intermediate link 108A, 106B wherein the third tension member 126C is fixed relative to the third link 108B for shifting an orientation of the third link 108 relative to the second link 106B.

In some embodiments, the first and second tension members 126A, 126B each have a free length 168 that is not in contact with the first and second links and spans the joint between the first and second links 106, 108. As shown in FIGS. 8 and 9, a first reference line $R_1$ extends between the first and second contact points 144, 146 when the first and second links 106A, 108A are in a first orientation, and the first reference line $R_1$ is equidistant from each of the free lengths 168 of the first and second tension members 126A, 126B. Similarly, referring now to FIGS. 10 and 11, a second reference line $R_2$ extends between third and fourth contact points 148, 150 when the first and second links 106B, 108B, i.e., the intermediate link and upper link for purposes of illustration, are in a second orientation. The second reference line $R_2$ is also equidistant from each of the free lengths 168 of the first and second tension members 126C, 126D.

In some embodiments, 1-degree of freedom joints 110 are formed between each link 105. In other embodiments, the snake-arm robot 100 may be provided with both 1-degree and 2-degree of freedom joints 110, or only 2 degree of freedom joints. In some embodiments, such as snake-arm robots 100 having a two-degree of freedom joint, four ropes 126 are terminated at one link 105 of every two joints 110. In other embodiments, two ropes 126 are terminated at each link 105, i.e. at every distal link 108 of every 1-degree of freedom joint 110. In some embodiments, the axis of rotation of each joint 110 is rotated relative to the adjacent joint 110 so that the distance from each rope 126 to each joint centerline CL (See FIG. 5) is maximized to minimize rope loading. Minimizing rope loading is useful in a number of ways, including reducing the size of rope 126 required for a given material choice and construction, reducing the required bulk of the links 105 to which the ropes are terminated and within which the ropes are supported, and reducing the compression on the structure of the snake-arm robot 100. The compression on the structure of the arm dictates the required strength of each link 105 and joint 110, but it also influences the elastic stability of the column of the snake-arm robot 100.

Figure 14:
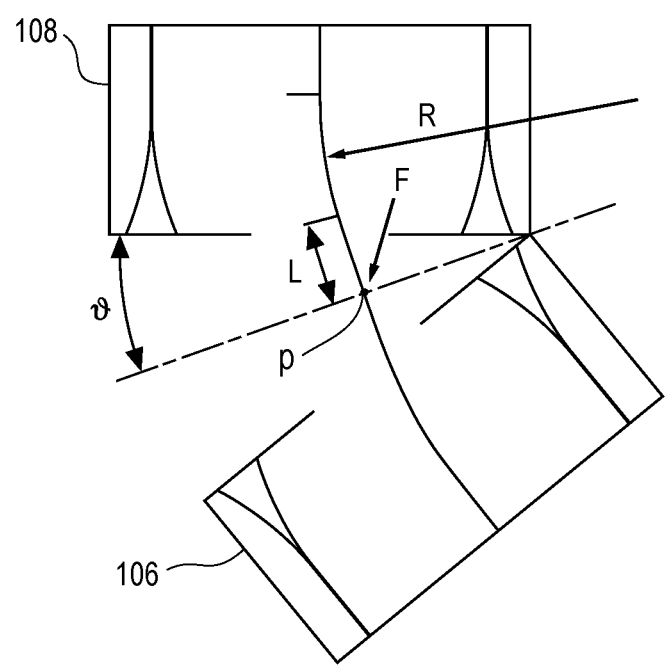
FIG. 14 is a geometric construction of the segment of FIG. 13 in a pivoted orientation for visualizing the locus of the contact point p at the end of a line of action of a net force F as configured in accordance with these teachings.

In some embodiments, including the embodiments described above, it has been discovered that it is possible to make the snake-arm robot 100 neutrally stable, i.e. to remove the tendency of the arm to buckle by configuring the joint 110 such that the instantaneous center of rotation of the joint 110 is in line with the effective line of action of the compressive loads F on the joint 110, as shown in FIGS. 9, 11 and 14.

An additional motivation in the design of a snake-arm robot of many degrees of freedom is to provide control simplicity. It will be appreciated that in the rigid link snake-arm robot 100, bending one joint 110 is achieved by pulling in a length of rope on one side of a joint, while paying out a length of rope on the other side of the joint. If the length of rope paid out and the length of rope pulled in is equal, and the directions opposite as described, the sum of the two lengths remains constant. This allows for simplification of the control of the movement of the joint 110, since it allows the two ropes (or rope portions of a single rope) to be controlled by one motor and coupled to a drum or windlass, or a linear actuator or the like.

The inventors have discovered that it is possible to satisfy both of the following criteria: 1) to have the contact point of each joint, or the reference line extending between multiple contact points of each joint, to be incident with the line of action of the net force acting on the joint, and 2) to have the amount of rope 126 paid out equal to the amount of rope pulled in. The solution may be constructed graphically or analytically, and results in generally cylindrical rolling contact surfaces for a single degree of freedom (2-D) joint, or generally spherical rolling contact surfaces for a two degree of freedom (3-D) joint, as shown and described herein.

Both of the above criteria are met when the center of the generally convex cylindrical or spherical surfaces lie in the same plane as the points of inflection of the ropes 126. The point of contact p between convex contact surfaces 140, 142 moves laterally relative to the contact surfaces as the joint bend angle $\vartheta$ changes, by an amount equal to the radius of the convex contact surface multiplied by the sine of half the joint bend angle $\vartheta$, which maintains the point of contact on a line between the centers of the convex contact surfaces 140, 142. In addition, since the centers of the two convex contact surfaces 140, 142 are always separated by a distance equal to the sum of the two radii of the convex contact surfaces, the sum of the lengths of paid out and pulled in ropes remains constant. This joint model works well for very flexible ropes, in which the bending of the ropes themselves as they transition from the straight lengths within the links to the straight lengths between the links happens over a very short distance, assumed to be zero length in the above description using idealized rope properties.

In some embodiments, the ropes are selected to be stiff when in tension, such as a stranded wire rope. These ropes may be made of a variety of materials, including steel, stainless steel or tungsten. The ability of stranded wire ropes to bend repeatably is limited by the strains in the strands or monofilaments of the ropes. A stranded construction using smaller monofilaments allows a tighter bend than a simpler rope with larger monofilaments, at the expense of higher cost, less wear resistance and more complex failure modes. The monofilaments in wire ropes are often cold drawn and work hardened to produce materials with very few defects in the material and very high tensile strength. One criterion used to determine the allowable minimum bend radius of a moving wire rope is to limit the reversing or repeating stresses in each monofilament to less than the fatigue limit or endurance limit of the material. This radius can be used to redefine how the rope bends. Accordingly, in some embodiments, the radius of the opposing sidewalls of the proximal and distal portions 152 of through openings 132 can be selected so as to be equal to or greater than a minimum bend radius of the ropes 126.

In some embodiments, the proximal portion 152 of at least one through opening 132 is enlarged along a first direction transverse to the longitudinal axis, and the distal portion 154 of the at least one through opening 132 is enlarged along a second direction transverse to the longitudinal axis that is different from the first direction. In general, the first and second directions are perpendicular to the axis of rotation of the joint 110. In some embodiments, the first and second directions are oriented at 30 degrees of rotation or more about the longitudinal axis L, such as 30, 45, 60, 75, or 90 degrees of rotation about the longitudinal axis L, as best seen in FIG. 7. In some embodiments, the proximal portion 152 of the at least one through opening 132 widens progressively along a proximal direction and the distal portion 154 of the at least one through opening 132 widens progressively along a distal direction. The proximal and distal portions 152, 154 of the through openings may be flared, such that opposing sidewalls or sidewall portions of the through openings 132 have an arcuate or radiused configuration that diverge away from one another.

Introducing a rope bend radius to a rolling joint arrangement can cause the line of action of the net force on a joint to be shifted away from the rolling contact point between the links, or away from a reference line extending between multiple contact points. Accordingly, the inventors discovered that the convex contact portions 118, 120 and the surface or surfaces thereof can be designed such that the line of action of the net force on the joint remains incident with the contact point or a reference line extending between multiple contact points. In some forms, the convex contact portions and surface or surfaces thereof have a non-circular profile as described further below.

Figure 13:
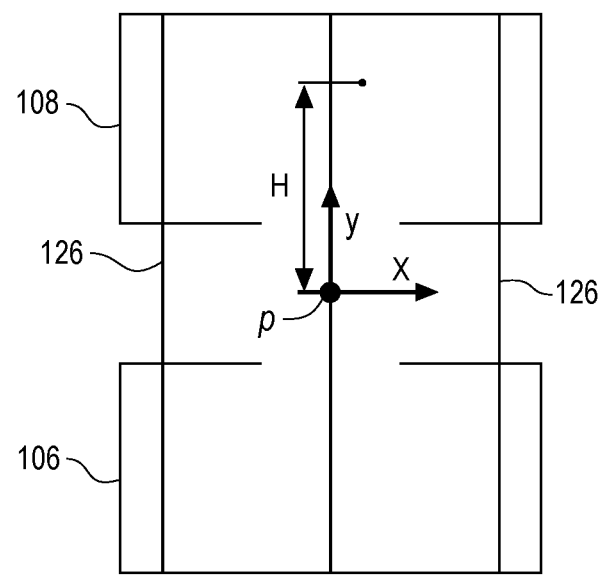
FIG. 13 is a geometric construction representing a segment of a snake-arm robot including adjacent links a neutral, aligned position as configured in accordance with these teachings.

As a means of explanation, FIG. 13 shows a simplified representation of a central cross-section of joint 110 including proximal and distal links 106, 108 aligned in a neutral position. The x-y coordinate system is located at contact point p in the straight, neutral position of the links and a height H from the end of the straight section of rope 126 having a length L within the upper, distal link 108 at the proximal end of the intermediate portion 156 of through opening 132. FIG. 14 shows a construction geometry for visualizing the locus of the contact points p, which defines the contour of the contact portions 118, 120, e.g., surfaces 140, 142, at the end of the line of action of the net force between links 106, 108 at the joint 110, at the bottom of the straight length L. Similarly, if there are multiple contact points between rolling contact surfaces, contact point p is at the intersection of the reference line extending between the contact points and the line of action of the net force acting on the joint. An imaginary radius R is equivalent to the rope bend radius, translated across the links so that its upper end joins to the straight link centerline. The length of the curved section is $R\vartheta$., if $\vartheta$ is expressed in radians.

To satisfy the constant rope length criterion, $L=H-R\vartheta$.

To keep the position of the point of contact p in the x-y coordinate system on the centerline between the two rope lines, the x-y coordinates of the contact point p as angle $\vartheta$ is varied is expressed parametrically as:

$x = R(1-\cos\vartheta) + L\sin\vartheta$ $y = H - (R\sin\vartheta + L\cos\vartheta)$ If uncompensated, the errors in rope length can be significant and may cause changes in tension and angular errors in a snake-arm robot sufficiently large to significantly affect the positional control. However, the shape of the ideal contact point curve described above, over a reasonable range of angular bend in the joints of the arm, while not a circular arc, is close enough to a circular arc that it may be preferable for manufacturing purposes to substitute a circular arc form for the more complex ideal contact point curve without causing functional issues. The circular arc does not, however, have the same radius as the original circular form. The simplest way to choose an approximating circle is to fit a circle with a center at x=0, a tangent to the horizontal x axis at y=0 and a point at the end of the ideal contact point arc, i.e. at the point of contact at the maximum bend angle of the joint. Other optimization strategies may be employed, e.g. minimizing the theoretical area between the non-circular arc and the circular approximation.

Figure 15:
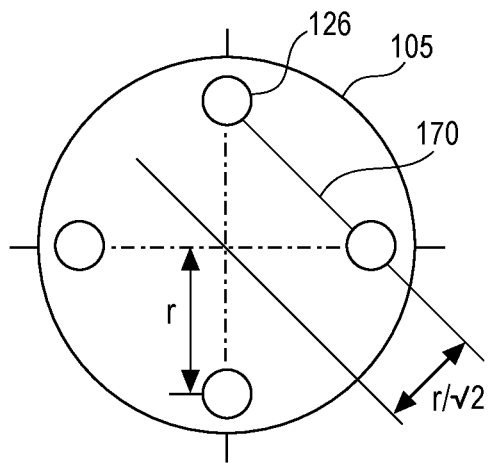
FIG. 15 is a plan view of a representation of a link having four equispaced ropes terminated therein.
Figure 16:
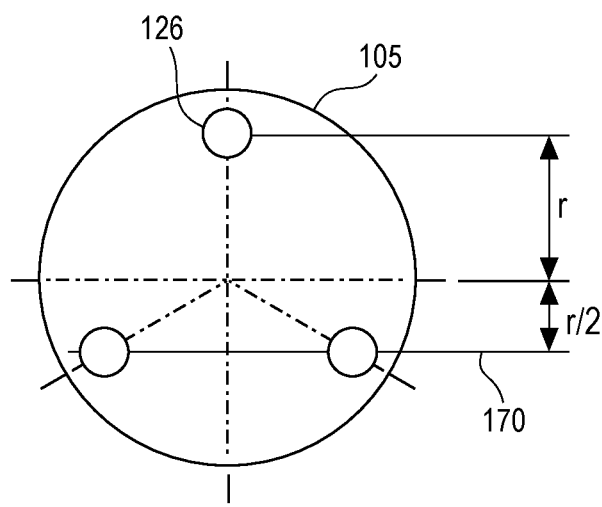
FIG. 16 is a plan view of a representation of a link having three equispaced ropes terminated therein.

FIGS. 15 and 16 illustrate two different embodiments of rope 126 spacing for the distal link of a two degree of freedom joint. FIG. 15 shows four equally spaced apart ropes 126 arranged in an annular pattern with a radius r and fixed to link 105. FIG. 16 shows three equally spaced apart ropes 126 arranged in an annular pattern with a radius r fixed within a link 105. The four-rope construction shown in FIG. 15 leaves less cross-sectional space in the link available, but provides design, construction and control simplicity. In addition, the four-rope construction can provide load capacity advantages. In particular, the minimum distance from the hinge center to the line of action 170 of a rope pair is larger (radius $r/\sqrt{2}$) in the 4-rope construction than in the 3-rope construction (radius r/2).

Other fixation patterns of the ropes 126 are possible and the ropes 126 need not be equally spaced as shown. If the ropes 126 are not equally spaced, the load in each rope would be different from the load in each rope in an equispaced example. In snake-arm robots 100 which are intended for generic applications without biased loading, equispaced tendons may provide the most uniform load capacity. However, in other applications wherein the snake-arm robot 100 is intended to be loaded in one particular direction, there can be advantages to spacing the ropes in the links unevenly.

Further aspects of the disclosure are provided by the subject matter of the following clauses:

A robot arm including: A first link and a second link positioned adjacent to one another along a longitudinal axis of the robot arm; a joint formed by the first and second links including a first convex contact portion of the first link and a second convex contact portion of the second link, the first and second convex contact portions configured to be in rolling contact with one another to allow the first and second links to pivot with respect to one another; wherein the first and second convex contact portions are configured to contact one another at first and second contact points at the first and second convex contact portions corresponding to a first orientation of the first and second links; wherein the first and second convex contact portions are configured to contact one another at third and fourth contact points at the first and second convex contact portions corresponding to a second orientation of the first and second links, wherein the second orientation is different from the first orientation; and wherein the joint is configured such that a line of action of a net force acting on the joint is incident with a first reference line extending between the first and second contact points when the first and second links are in the first orientation, and the line of action of the net force acting on the joint is incident with a second reference line extending between the third and fourth contact points when the first and second links are in the second orientation.

The robot arm of any of the preceding clauses, wherein an entirety of the first and second convex contact portions are convex.

The robot arm of any of the preceding clauses, wherein the first and second convex contact portions each include a plurality of convex contact surfaces, wherein at least one of the plurality of convex contact surfaces is noncontiguous with another one of the plurality of convex contact surfaces.

The robot arm of any of the preceding clauses, wherein the first and second convex contact surfaces each include a plurality of convex contact surfaces, wherein the plurality of convex contact surfaces of each link extend along a cylindrical contour so as to allow movement of the first and second links with respect to one another with only a single degree of freedom.

The robot arm of any of the preceding clauses, wherein the second link includes a third convex contact portion opposite the second convex contact portion that is configured to be in rolling contact with a fourth convex contact portion of a third link positioned distally along the longitudinal axis from the second link, wherein the third convex contact portion is rotated at least 30 degrees about the longitudinal axis to allow the third link to be pivoted in a direction different than a direction the second link is pivoted relative to the first link.

The robot arm of any of the preceding clauses, wherein each of the first and second links include a plurality of through openings extending between proximal and distal ends thereof, wherein at least one of the plurality of through openings includes proximal and distal portions that are enlarged relative to an intermediate portion of the through opening that extends between the proximal and distal portions.

The robot arm of any of the preceding clauses, wherein the proximal portion of the at least one through opening is enlarged along a first direction transverse to the longitudinal axis, and the distal portion of the at least one through opening is enlarged along a second direction transverse to the longitudinal axis that is different from the first direction.

The robot arm of any of the preceding clauses, wherein the first direction is perpendicular to second direction.

The robot arm of any of the preceding clauses, wherein the proximal portion of the at least one through opening widens progressively along a proximal direction and the distal portion of the at least one through opening widens progressively along a distal direction.

The robot arm of any of the preceding clauses, further including at least one alignment feature configured to inhibit sliding of the first and second convex contact portions with respect to one another.

The robot arm of any of the preceding clauses, wherein the at least one alignment feature includes gear teeth of the first link and corresponding gear teeth of the second link that are configured to engage with one another when the first and second links are shifted between the first and second orientations.

The robot arm of any of the preceding clauses, wherein the gear teeth of each of the first and second links are disposed along an outer periphery of the first and second links.

The robot arm of any of the preceding clauses, further including first and second through openings extending through each of the first and second links; a first tension member extending through the first through opening of the first link and at least partially through the first through opening of the second link; a second tension member extending through the second through opening of the first link and at least partially through the second through opening of the second link; wherein the first and second tension members are fixed relative to the second link to allow the second link to be pivoted relative to the first link by pulling in one of the first and second tension members proximally and paying out an other of the first and second tension members; and wherein a length of the one of the first and second tension members that is pulled in is equal to the length of the other of the first and second tension members that is payed out.

The robot arm of any of the preceding clauses, further including a third tension member extending at least partially through a third link that is distally adjacent to the second link, wherein the third tension member is fixed relative to the third link for shifting an orientation of the third link relative to the second link.

The robot arm of any of the preceding clauses, wherein the first and second tension members each have a free length that spans the joint between the first and second links; wherein a first reference line extending between the first and second contact points when the first and second links are in the first orientation is equidistant from each of the free lengths of the first and second tension members, and a second reference line extending between the third and fourth contact points when the first and second links are in the second orientation is also equidistant from each of the free lengths of the first and second tension members.

A robot arm including: A first link and a second link positioned adjacent to one another along a longitudinal axis of the robot arm; a joint formed between the first and second links including a first convex contact portion of the first link and a second convex contact portion of the second link, the first and second convex contact portions configured to be in rolling contact with one another to allow the first and second links to pivot with respect to one another; wherein the first and second convex contact portions are configured to contact one another at first and second contact points at the first and second convex contact portions corresponding to a first orientation of the first and second links; wherein the first and second convex contact portions are configured to contact one another at third and fourth contact points at the first and second convex contact portions corresponding to a second orientation of the first and second links, wherein the second orientation is different from the first orientation; a first tension member extending through the first link and at least a portion of the second link; a second tension member extending through the first and at least a portion of the second link; wherein the first and second tension members are fixed relative to the second link to allow the second link to be pivoted relative to the first link by pulling in one of the first and second tension members proximally and paying out an other of the first and second tension members distally; wherein the first and second tension members each have a free length that spans the joint between the first and second links; and wherein a first reference line extending between the first and second contact points when the first and second links are in the first orientation is equidistant from each of the free lengths of the first and second tension members, and a second reference line extending between the third and fourth contact points when the first and second links are in the second orientation is also equidistant from each of the free lengths of the first and second tension members.

The robot arm of any of the preceding clauses, further including at least one alignment feature configured to inhibit sliding of the first and second convex contact portions with respect to one another.

The robot arm of any of the preceding clauses, wherein the at least one alignment feature includes gear teeth of the first link and corresponding gear teeth of the second link that are configured to engage with one another when the first and second links are shifted between different joint angles.

The robot arm of any of the preceding clauses, wherein the gear teeth are disposed along an outer periphery of each of the first and second links.

The robot arm of any of the preceding clauses, wherein for each of the first and second orientations of the first and second links, a length of the one of the first and second tension members that is pulled in proximally is equal to a length of the other of the first and second tension members that is payed out distally.

The robot arm of any of the preceding clauses, wherein an entirety of the first and second convex contact portions are convex.

The robot arm of any of the preceding clauses, wherein the first and second convex contact portions each include a plurality of convex contact surfaces, wherein at least one of the plurality of convex contact surfaces is noncontiguous with the other of the plurality of convex contact surfaces.

The robot arm of any of the preceding clauses, wherein the first and second convex contact portions each include a plurality of convex contact surfaces, wherein the plurality of convex contact surfaces of each link extend along a cylindrical contour so as to allow movement of the first and second links with respect to one another with only a single degree of freedom.

The robot arm of any of the preceding clauses, wherein the second link includes a third convex contact portion opposite the second convex contact portion that is configured to be in rolling contact with a fourth convex contact portion of a third link positioned distally along the longitudinal axis from the second link, wherein the third convex contact portion is rotated at least 30 degrees about the longitudinal axis to allow the third link to be pivoted in a direction different than a direction the second link is pivoted relative to the first link.

The robot arm of any of the preceding clauses, wherein each of the first and second links include a plurality of through openings extending between proximal and distal ends thereof, wherein at least one of the plurality of through openings includes proximal and distal portions that are enlarged relative to an intermediate portion of the through opening that extends between the proximal and distal portions.

The robot arm of any of the preceding clauses, wherein the proximal portion of the at least one through opening is enlarged along a first direction transverse to the longitudinal axis, and the distal portion of the at least one through opening is enlarged along a second direction transverse to the longitudinal axis that is different from the first direction.

The robot arm of any of the preceding clauses, wherein the first direction is perpendicular to the second direction.

The robot arm of any of the preceding clauses, wherein the proximal portion of the at least one through opening widens progressively along a proximal direction and the distal portion of the at least one through opening widens progressively along a distal direction.

The robot arm of any of the preceding clauses, further including a third tension member extending at least partially through a third link that is distally adjacent to the second link, wherein the third tension member is fixed relative to the third link for shifting an orientation of the third link relative to the second link.

A robot arm, including: a first link and a second link positioned adjacent to one another along a longitudinal axis of the robot arm; a joint formed between the first and second links including a first convex contact portion of the first link and a second convex contact portion of the second link, the first and second convex contact portions configured to be in rolling contact with one another to allow the first and second links to pivot with respect to one another; a first tension member extending through the first and second links; a second tension member extending through the first and second links; wherein the first and second tension members are fixed relative to the second link to allow the second link to be pivoted relative to the first link at one of a plurality of different joint angles measured between the first and second links by pulling in one of the first and second tension members proximally and paying out an other of the first and second tension members distally; wherein the first and second tension members each have an inflection point positioned between the first and second links corresponding to each of the plurality of different joint angles except for when the first and second links are aligned along the longitudinal axis such that the joint angle is zero; wherein the first and second convex contact portions are configured such that at each of the plurality of different joint angles, a center of rotation between the first and second convex contact portions lies in a reference plane containing the inflection points of the first and second tension members.

What is claimed is:

1. A robot arm comprising:
a first link and a second link positioned adjacent to one another along a longitudinal axis of the robot arm;
a joint formed by the first and second links comprising a first convex contact portion of the first link and a second convex contact portion of the second link, the first and second convex contact portions configured to be in rolling contact with one another to allow the first and second links to pivot with respect to one another;
wherein the first and second convex contact portions are configured to contact one another at first and second contact points at the first and second convex contact portions corresponding to a first orientation of the first and second links;
wherein the first and second convex contact portions are configured to contact one another at third and fourth contact points at the first and second convex contact portions corresponding to a second orientation of the first and second links, wherein the second orientation is different from the first orientation;
wherein the joint is configured such that a line of action of a net force acting on the joint is incident with a first reference line extending between the first and second contact points when the first and second links are in the first orientation, and the line of action of the net force acting on the joint is incident with a second reference line extending between the third and fourth contact points when the first and second links are in the second orientation; and
wherein each of the first and second links comprise a plurality of through openings extending between proximal and distal ends thereof, wherein at least one of the plurality of through openings comprises proximal and distal portions that are enlarged relative to an intermediate portion of the through opening that extends between the proximal and distal portions.

2. The robot arm of claim 1, wherein the first and second convex contact portions each comprise a plurality of convex contact surfaces, wherein at least one of the plurality of convex contact surfaces is noncontiguous with another one of the plurality of convex contact surfaces.

3. The robot arm of claim 1, wherein the first and second convex contact portions each comprise a plurality of convex contact surfaces, wherein the plurality of convex contact surfaces of each link extend along a cylindrical contour so as to allow movement of the first and second links with respect to one another with only a single degree of freedom.

4. The robot arm of claim 1, wherein the second link comprises a third convex contact portion opposite the second convex contact portion that is configured to be in rolling contact with a fourth convex contact portion of a third link positioned distally along the longitudinal axis from the second link, wherein the third convex contact portion is rotated at least 30 degrees about the longitudinal axis to allow the third link to be pivoted in a direction different than a direction the second link is pivoted relative to the first link.

5. The robot arm of claim 1, wherein the proximal portion of the at least one through opening is enlarged along a first direction transverse to the longitudinal axis, and the distal portion of the at least one through opening is enlarged along a second direction transverse to the longitudinal axis that is different from the first direction.

6. The robot arm of claim 1, wherein the proximal portion of the at least one through opening widens progressively along a proximal direction and the distal portion of the at least one through opening widens progressively along a distal direction.

7. The robot arm of claim 1, further comprising gear teeth of the first link and corresponding gear teeth of the second link that are configured to engage with one another and inhibit sliding of the first and second convex contact portions with respect to one another when the first and second links are shifted between the first and second orientations, wherein the gear teeth of each of the first and second links are disposed along an outer periphery of the first and second links.

8. The robot arm of claim 1, further comprising first and second through openings extending through each of the first and second links;
 a first tension member extending through the first through opening of the first link and at least partially through the first through opening of the second link;
 a second tension member extending through the second through opening of the first link and at least partially through the second through opening of the second link;
 wherein the first and second tension members are fixed relative to the second link to allow the second link to be pivoted relative to the first link by pulling in one of the first and second tension members proximally and paying out an other of the first and second tension members; and
 wherein a length of the one of the first and second tension members that is pulled in is equal to a length of the other of the first and second tension members that is payed out.

9. The robot arm of claim 8, further comprising a third tension member extending at least partially through a third link that is distally adjacent to the second link, wherein the third tension member is fixed relative to the third link for shifting an orientation of the third link relative to the second link.

10. The robot arm of claim 8, wherein the first and second tension members each have a free length that spans the joint between the first and second links;
 wherein the first reference line extending between the first and second contact points when the first and second links are in the first orientation is equidistant from each of the free lengths of the first and second tension members, and the second reference line extending between the third and fourth contact points when the first and second links are in the second orientation is also equidistant from each of the free lengths of the first and second tension members.

11. A robot arm comprising:
 a first link and a second link positioned adjacent to one another along a longitudinal axis of the robot arm;
 a joint formed between the first and second links comprising a first convex contact portion of the first link and a second convex contact portion of the second link, the first and second convex contact portions configured to be in rolling contact with one another to allow the first and second links to pivot with respect to one another;
 wherein the first and second convex contact portions are configured to contact one another at first and second contact points at the first and second convex contact portions corresponding to a first orientation of the first and second links;
 wherein the first and second convex contact portions are configured to contact one another at third and fourth contact points at the first and second convex contact portions corresponding to a second orientation of the first and second links, wherein the second orientation is different from the first orientation;
 a first tension member extending through the first link and at least a portion of the second link;
 a second tension member extending through the first link and at least a portion of the second link;
 wherein the first and second tension members are fixed relative to the second link to allow the second link to be pivoted relative to the first link by pulling in one of the first and second tension members proximally and paying out an other of the first and second tension members distally;
 wherein the first and second tension members each have a free length that spans the joint between the first and second links;
 wherein a first reference line extending between the first and second contact points when the first and second links are in the first orientation is equidistant from each of the free lengths of the first and second tension members, and a second reference line extending between the third and fourth contact points when the first and second links are in the second orientation is also equidistant from each of the free lengths of the first and second tension members; and
 wherein each of the first and second links comprise a plurality of through openings extending between proximal and distal ends thereof, wherein at least one of the plurality of through openings comprises proximal and distal portions that are enlarged relative to an intermediate portion of the through opening that extends between the proximal and distal portions.

12. The robot arm of claim 11, wherein for each of the first and second orientations of the first and second links, a length of the one of the first and second tension members that is pulled in proximally is equal to a length of the other of the first and second tension members that is payed out distally.

13. The robot arm of claim 11, wherein the first and second convex contact portions each comprise a plurality of convex contact surfaces, wherein at least one of the plurality of convex contact surfaces is noncontiguous with the other of the plurality of convex contact surfaces.

14. The robot arm of claim 11, wherein the first and second convex contact portions each comprise a plurality of convex contact surfaces, wherein the plurality of convex contact surfaces of each link extend along a cylindrical contour so as to allow movement of the first and second links with respect to one another with only a single degree of freedom.

15. The robot arm of claim 11, wherein the second link comprises a third convex contact portion opposite the second convex contact portion that is configured to be in rolling contact with a fourth convex contact portion of a third link positioned distally along the longitudinal axis from the second link, wherein the third convex contact portion is rotated at least 30 degrees about the longitudinal axis to allow the third link to be pivoted in a direction different than a direction the second link is pivoted relative to the first link.

16. The robot arm of claim 11, wherein the proximal portion of the at least one through opening is enlarged along a first direction transverse to the longitudinal axis, and the distal portion of the at least one through opening is enlarged along a second direction transverse to the longitudinal axis that is different from the first direction.

17. The robot arm of claim 11, wherein the proximal portion of the at least one through opening widens progressively along a proximal direction and the distal portion of the at least one through opening widens progressively along a distal direction.

18. The robot arm of claim 11, further comprising a third tension member extending at least partially through a third link that is distally adjacent to the second link, wherein the third tension member is fixed relative to the third link for shifting an orientation of the third link relative to the second link.

* * * * *